(12) United States Patent
Campbell et al.

(10) Patent No.: US 9,976,617 B2
(45) Date of Patent: May 22, 2018

(54) CONED-DISC SPRING DEVICE, SPRING ASSEMBLY, AND METHODS OF MAKING THE SAME

(75) Inventors: Mark W. Campbell, Lafayette, IN (US); Kelly L. Falls, Fort Wayne, IN (US); Donald E. Paul, Logansport, IN (US)

(73) Assignee: MW Industries, Inc., Rosemont, IL (US)

( * ) Notice: Subject to any disclaimer, the term of this patent is extended or adjusted under 35 U.S.C. 154(b) by 0 days. days.

(21) Appl. No.: 14/354,007

(22) PCT Filed: Jul. 17, 2012

(86) PCT No.: PCT/US2012/047042
§ 371 (c)(1),
(2), (4) Date: May 7, 2014

(87) PCT Pub. No.: WO2013/062644
PCT Pub. Date: May 2, 2013

(65) Prior Publication Data
US 2014/0252705 A1 Sep. 11, 2014

(30) Foreign Application Priority Data

Oct. 27, 2011 (WO) .................. PCT/US2011/05813

(51) Int. Cl.
*F16F 1/32* (2006.01)
(52) U.S. Cl.
CPC ........... *F16F 1/32* (2013.01); *Y10T 29/49609* (2015.01)
(58) Field of Classification Search
CPC ....... F16F 1/32; F16F 1/44; F16F 3/02; B60T 13/04

USPC ................. 267/161, 162; 29/896.9
See application file for complete search history.

(56) References Cited

U.S. PATENT DOCUMENTS

| 2,323,985 | A | * | 7/1943 | Fausek | ..................... F16J 3/047 228/182 |
| 4,680,847 | A | | 7/1987 | Bauer | |
| 4,690,623 | A | * | 9/1987 | Eickmann | ............. F01L 319/00 417/271 |

(Continued)

OTHER PUBLICATIONS

PCT/US2012/047042; International Bureau of WIPO, International Preliminary Report on Patentability, dated Apr. 29, 2014.

(Continued)

*Primary Examiner* — Robert A. Siconolfi
*Assistant Examiner* — San Aung
(74) *Attorney, Agent, or Firm* — Ice Miller LLP

(57) ABSTRACT

A coned-disc spring device, spring assembly, methods of making the same, and methods of assembling a spring system are disclosed. Such a device includes a first end defining a first opening and a second end defining a second opening, wherein the diameter of the second opening is larger than the diameter of the first opening. The device also includes a lip portion at the second end of the device adjacent to and at least partially encircling the second opening and protruding substantially perpendicular to the plane defined by the second opening such that when a portion of a second spring member having a first groove portion is received within the second opening, the first lip portion is received within the first groove portion to optimally align the second spring member.

17 Claims, 23 Drawing Sheets

(56) References Cited

U.S. PATENT DOCUMENTS

| | | | | |
|---|---|---|---|---|
| 4,799,654 | A | * | 1/1989 | Eickmann .......... F04B 43/0063 267/162 |
| 4,968,010 | A | * | 11/1990 | Odobasic .............. B60G 11/48 267/140.11 |
| 5,190,264 | A | * | 3/1993 | Boger .................... F16J 15/186 251/214 |
| 5,222,718 | A | * | 6/1993 | Buck .................... E21B 31/107 166/178 |
| 5,503,783 | A | | 4/1996 | Nakagawa et al. |
| 7,134,648 | B1 | * | 11/2006 | Rode ........................ F16F 1/32 267/162 |
| 2004/0195744 | A1 | | 10/2004 | Sancaktar et al. |
| 2010/0164147 | A1 | | 7/2010 | Rodman |
| 2011/0037210 | A1 | * | 2/2011 | Rode ........................ F16F 1/32 267/162 |

OTHER PUBLICATIONS

PCT/US2011/058132; International Bureau of WIPO, International Preliminary Report on Patentability, dated Apr. 29, 2014.

* cited by examiner

CONED-DISC SPRING DEVICE, SPRING ASSEMBLY, AND METHODS OF MAKING THE SAME

CROSS REFERENCE TO RELATED APPLICATION

This National Stage patent application claims the benefit of and incorporates by reference herein the disclosure of PCT/US2012/047042, filed Jul. 17, 2012.

BACKGROUND

Springs can store mechanical energy and are used in all different types of applications from shock absorbers to clocks. Typically, engineers and designers rely on traditional helical compression springs to satisfy their particular spring needs. Unfortunately, the helical compression springs in use today fail to adequately address two major issues that adversely affect performance, namely side loading and hysteresis. Side loading is a common characteristic of springs that results in a significant increase in the internal friction of various mating components, such as, for example, shock absorbers. Such internal friction accelerates component wear and tear and degrades overall performance of the spring/shock absorber assembly. Hysteresis is the reduction in spring rate during expansion as compared to compression; it is generally a measure of the degradation of energy storage capacity and efficiency of the spring.

Because springs in use today fail to address side loading and hysteresis issues, engineers and designers find it necessary to replace components that exhibit performance deterioration from wear and tear generated by excessive spring side loading. As a result, there exists a need for improved spring design that can support the requirements of various applications but also remedy side loading and hysteresis issues in an effective and efficient manner.

SUMMARY

The present disclosure discloses a coned-disc spring device, spring assembly, and methods of making the same.

In an exemplary embodiment of the spring device, a first coned-disc spring device includes a first end that defines a first opening. The first device also includes a second end that defines a second opening. The diameter of the second opening is larger than the diameter of the first opening. The first device also includes a first lip portion at the second end of the device adjacent to and at least partially encircling the second opening and protruding substantially perpendicular to a horizontal plane defined by the second opening such that when a portion of a second spring member having a first groove portion is received within the second opening, the first lip portion is received within the first groove portion optimally aligning the second spring member.

In an exemplary embodiment of the spring device, a first coned-disc spring device includes a first end that defines a first opening. The first device also includes a second end that defines a second opening. The diameter of the second opening is larger than the diameter of the first opening. The first device also includes a first lip portion at the first end of the device adjacent to the first opening and protruding substantially perpendicular to a horizontal plane defined by the first opening such that when a portion of a second spring member having a first groove portion is received within the second opening, the first lip portion is received within the first groove portion to optimally align the second spring member.

In an exemplary embodiment of the spring device, a first coned-disc spring device includes a first end that defines a first opening. The first device also includes a second end that defines a second opening. The diameter of the second opening is larger than the diameter of the first opening. The first device also includes a first lip portion at the second end of the device adjacent to the second opening and protruding substantially perpendicular to a horizontal plane defined by the second opening such that when a portion of the first end of the device is received within a second spring member having a first groove portion, the first lip portion is received within the first groove portion optimally aligning the device.

In an exemplary embodiment of the spring device, a first coned-disc spring device includes a first end that defines a first opening. The first device also includes a second end that defines a second opening. The diameter of the second opening is larger than the diameter of the first opening. The first device also includes a first lip portion at the first end of the device adjacent to and at least partially encircling the first opening and protruding substantially perpendicular to a horizontal plane defined by the first opening such that when a portion of the first end of the device is received within a second spring member having a first groove portion, the first lip portion is received within the first groove portion optimally align the device.

The first device in any of the exemplary embodiments above may, optionally, include one or more grooves and/or one or more additional lips. When a second spring member is received within the first device, the lip(s) of the first device optimally aligns the second spring member. When the first device is received within the second spring member, the lip(s) of the second device optimally aligns the first device. The first device may also include only grooves.

In an exemplary embodiment of the spring assembly, the assembly includes a first coned-disc spring device and a second spring device. The first coned-disc spring device defines a first opening at a first end of the first device and a second opening at a second end of the first device. The first device also includes a first lip portion at the second end of the first device adjacent to and at least partially encircling the second opening and protruding substantially perpendicular to a horizontal plane defined by the second opening, wherein the second opening has a larger diameter than the first opening. The second spring device defines a third opening at a first end of the second spring device and a fourth opening at a second end of the second spring device. The second spring device includes a first groove portion at the first end of the second spring device, wherein the fourth opening has a larger diameter than the third opening. The first end of the second spring device is configured to be received within the second end of the first device such that the first lip portion is received within the first groove portion optimally aligning the second spring device.

Multiple spring devices can be assembled into a spring assembly that includes a first device and a second spring device. In an exemplary embodiment a method of assembling a spring assembly includes providing a first coned-disc spring device and a second spring device. The first device includes a first end defining a first opening, a second end defining a second opening, wherein the diameter of the second opening is larger than the diameter of the first opening, and a lip portion at the second end of the first device adjacent to and at least partially encircling the second opening and protruding substantially perpendicular to a horizontal plane defined by the second opening. The second spring device includes a first end defining a third opening, a second end defining a fourth opening, wherein the diameter of the fourth opening is larger than the diameter of the third opening, and a groove portion at the first end of the second spring device. The method includes the step of mating the first device and the second device such that at least a portion of the first end of the second device is received within at least a portion of the second opening of the first device, wherein the lip portion is received within the groove portion to optimally align the second device.

In an exemplary embodiment of a method of assembling a spring assembly, the method includes providing a first coned-disc spring device and a second spring device. The first device includes a first end defining a first opening, a second end defining a second opening, wherein the diameter of the second opening is larger than the diameter of the first opening, and a lip portion at the first end of the first device adjacent to the first opening and protruding substantially perpendicular to a horizontal plane defined by the first opening. The second spring device includes a first end defining a third opening, a second end defining a fourth opening, wherein the diameter of the fourth opening is larger than the diameter of the third opening, and a groove portion at the first end of the second spring device. The method includes the step of mating the first device and the second device such that at least a portion of the first end of the second device is received within the second opening of the first device, wherein the lip portion is received within the groove portion to optimally align the second device.

The present disclosure also discloses methods of forming a first device from carbon-composite, which may include the step of providing a mold that is designed to produce the first device, filling at least a portion of the mold with a composite material, and curing the composite material.

BRIEF DESCRIPTION OF THE DRAWINGS

The features and advantages of this disclosure, and the manner of attaining them, will be more apparent and better understood by reference to the accompanying drawings, wherein.

DETAILED DESCRIPTION

Figure 1A:
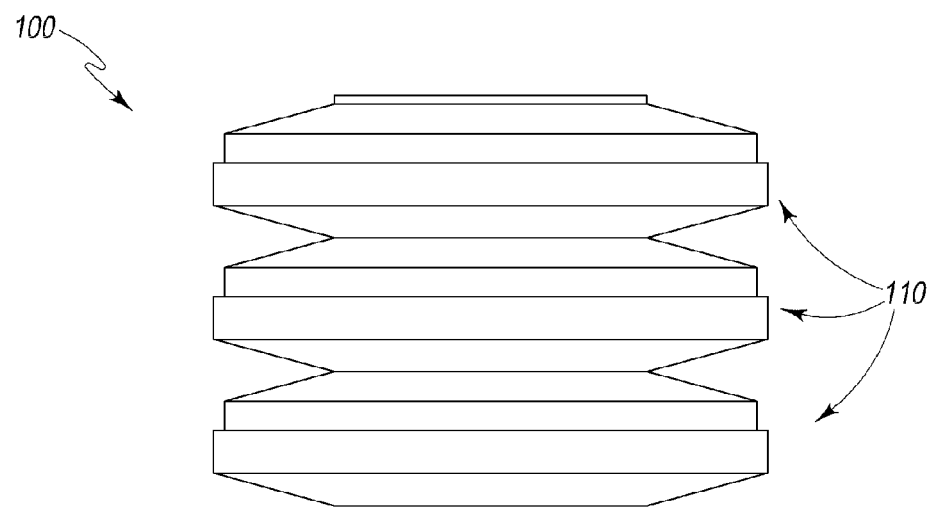
FIG. 1A shows an exemplary spring system according to at least one embodiment of the present disclosure.

For the purposes of promoting an understanding of the principles of the present disclosure, reference will now be made to the variations and/or embodiments illustrated in the drawings, and specific language will be used to describe the same. It will nevertheless be understood that no limitation of the scope of this disclosure is thereby intended.

FIGS. 1A-1H illustrate spring systems 100 according to the present disclosure. Such spring systems 100 can be used as a replacement for traditional helical compression springs in automotive, aerospace, and various other applications. As shown in FIGS. 1A-1H, each spring system 100 is made up of spring assemblies 110 that are stacked upon one another. As shown in FIGS. 2A-2L, each spring assembly 110 is comprised of spring devices 300, 400 (described below) that have been mated together. Typically, when devices 300, 400 are used in a spring system 100, spring assembly 110, or alone, they are used with a mandrel passing through the device 300, 400 or a cylindrical surface in contact with the outside periphery of the spring device to serve as a guide, so they can be maintained in alignment when a load is applied. Each one of these devices 300, 400 is designed to be loaded, statically or dynamically, by compressing the device 300, 400 (e.g., compressing the cone).

Figure 3A:
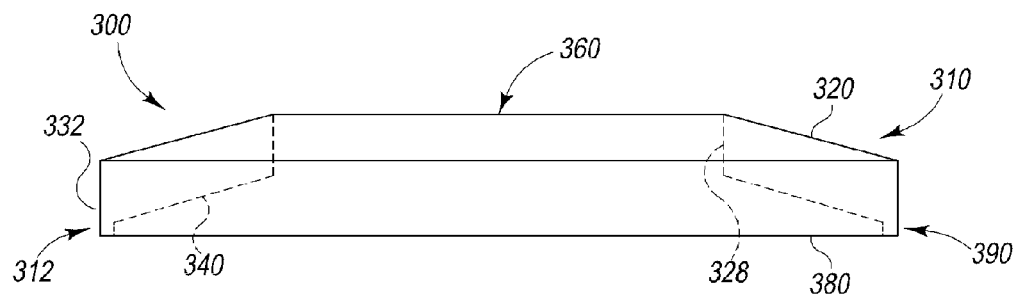
FIG. 3A shows a front view of an exemplary coned-disc spring device that can be used in the spring assemblies of FIG. 1A.
Figure 3B:
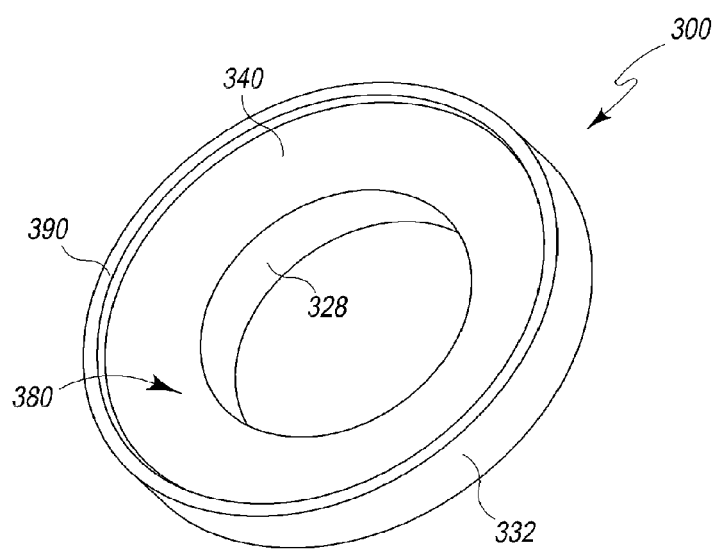
FIG. 3B shows a perspective view of the device of FIG. 3A.
Figure 3C:
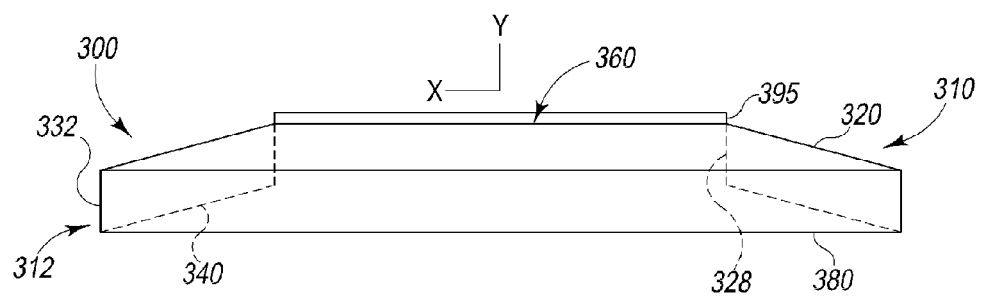
FIG. 3C shows a front view of an exemplary coned-disc spring that can be used in the spring assemblies of FIGS. 1C-1D.
Figure 3D:
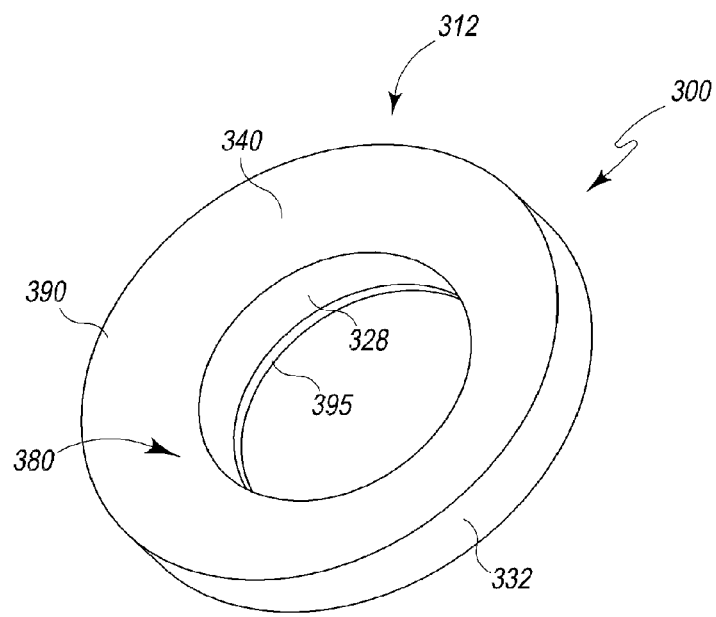
FIG. 3D shows a perspective view of the device of FIG. 3C.
Figure 3E:
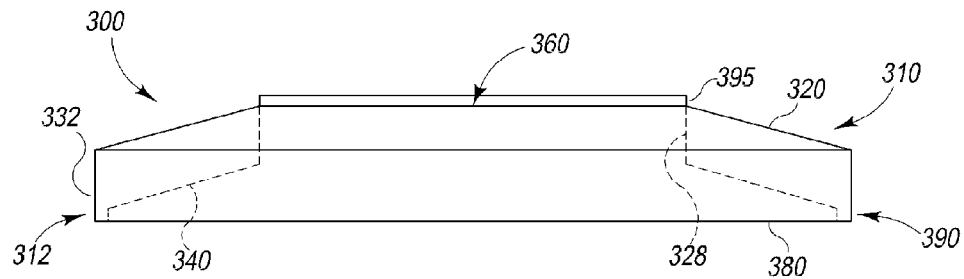
FIG. 3E shows a front view of another coned-disc spring device that can also be used in the spring assemblies of FIGS. 1C-1D.
Figure 3F:
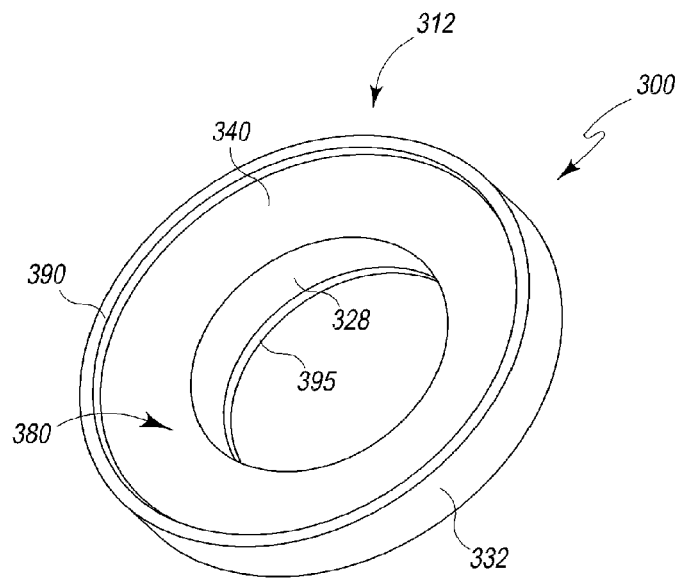
FIG. 3F shows a perspective view of the device of FIG. 3E.
Figure 3G:
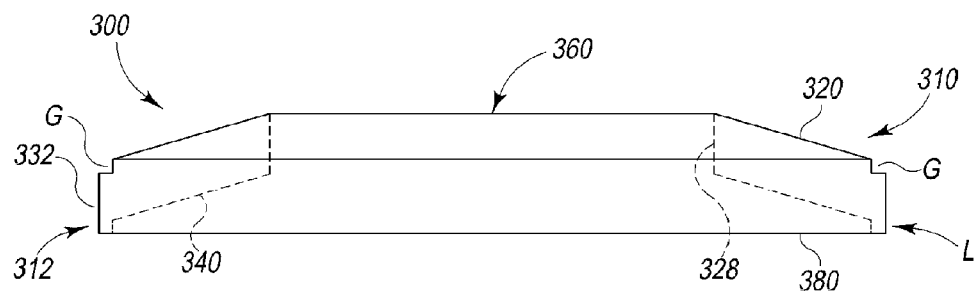
FIG. 3G shows a front view of another coned-disc spring device according to at least one embodiment of the present disclosure.
Figure 3H:
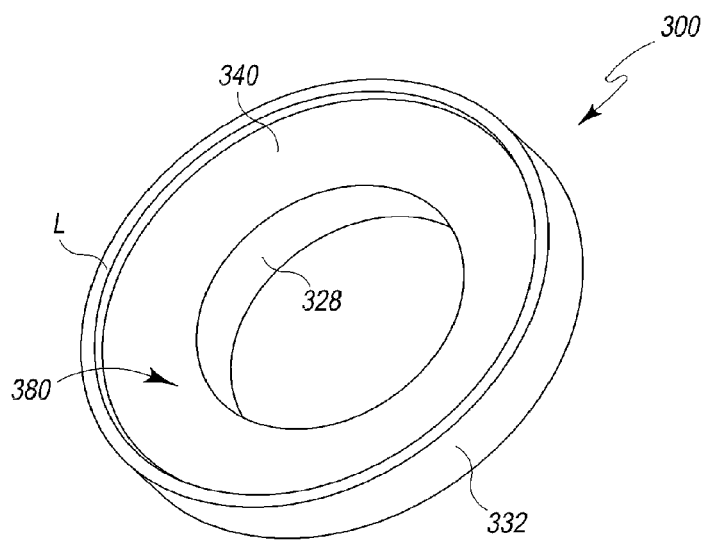
FIG. 3H shows a perspective view of the device of FIG. 3G.
Figure 3I:
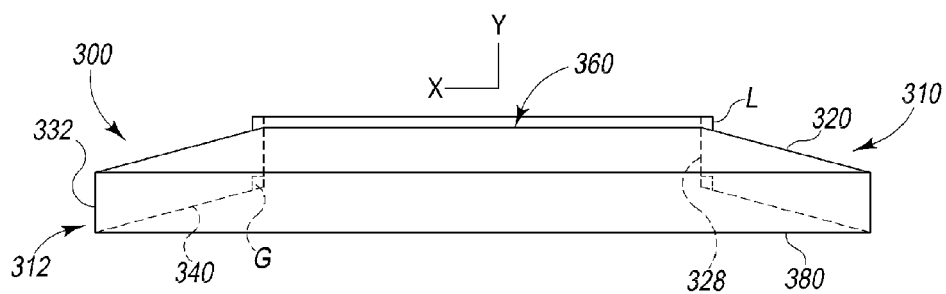
FIG. 3I shows a front view of another coned-disc spring device according to at least one embodiment of the present disclosure.
Figure 3J:
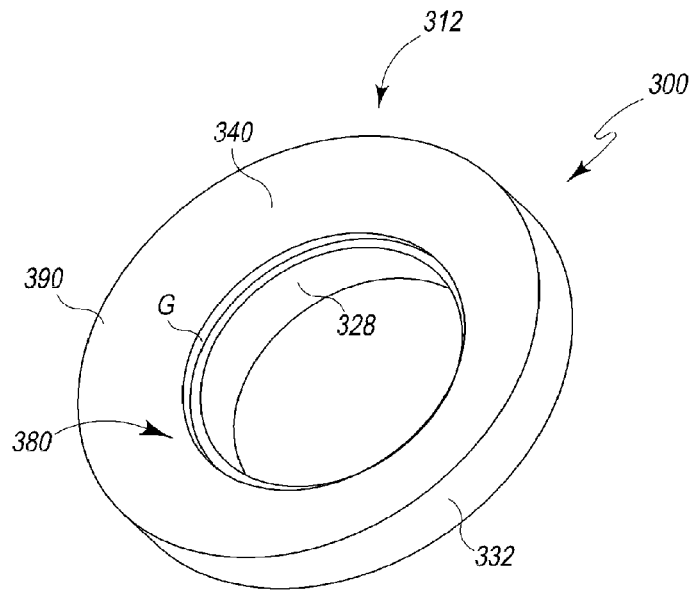
FIG. 3J shows a perspective view of the device of FIG. 3I.
Figure 3K:
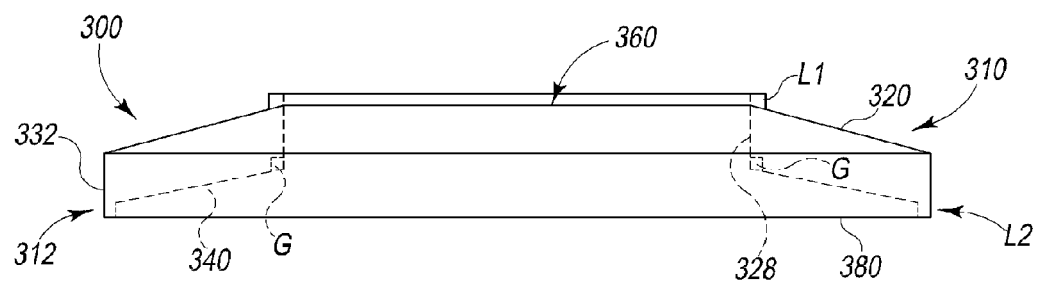
FIG. 3K shows a front view of another coned-disc spring device according to at least one embodiment of the present disclosure.
Figure 3L:
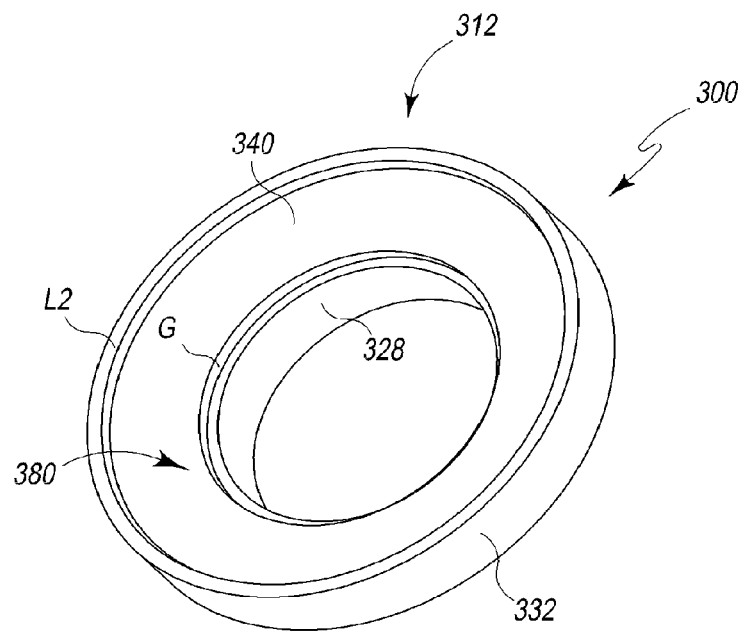
FIG. 3L shows a perspective view of the device of FIG. 3K.
Figure 3M:
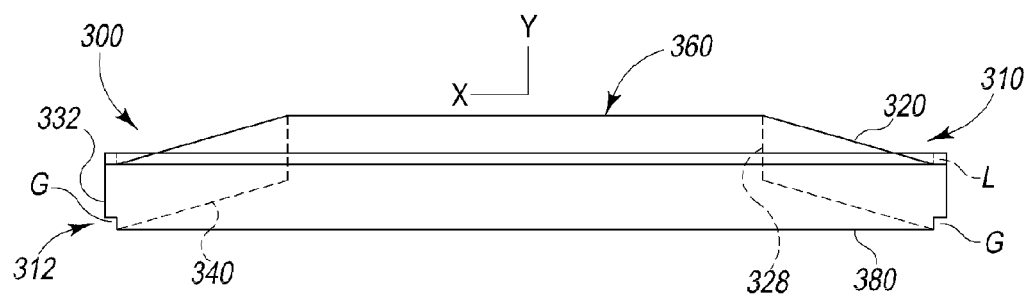
FIG. 3M shows a front view of another coned-disc spring device according to at least one embodiment of the present disclosure.
Figure 3N:
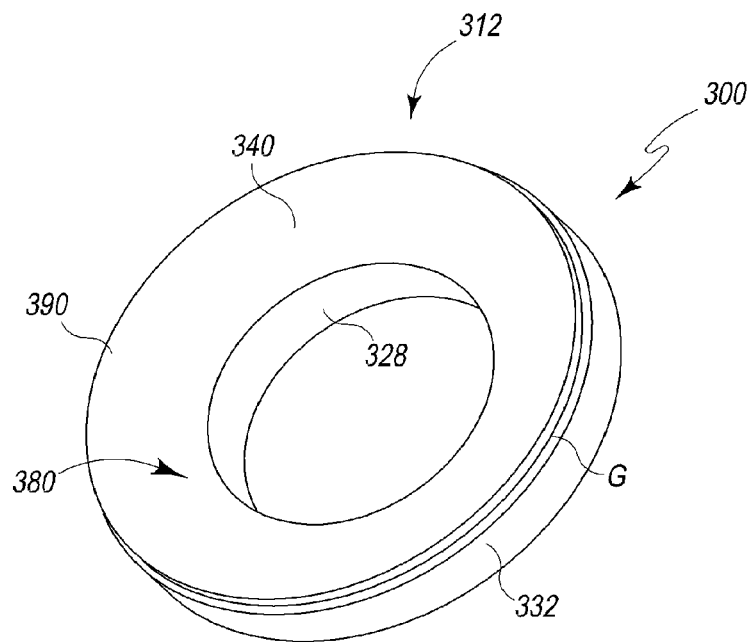
FIG. 3N shows a perspective view of the device of FIG. 3M.
Figure 3O:
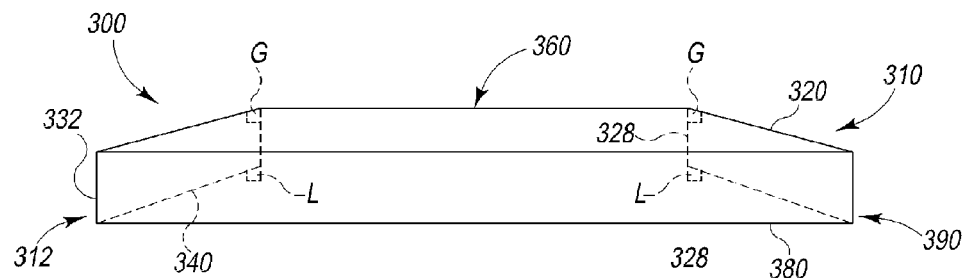
FIG. 3O shows a front view of another coned-disc spring device according to at least one embodiment of the present disclosure.
Figure 3P:
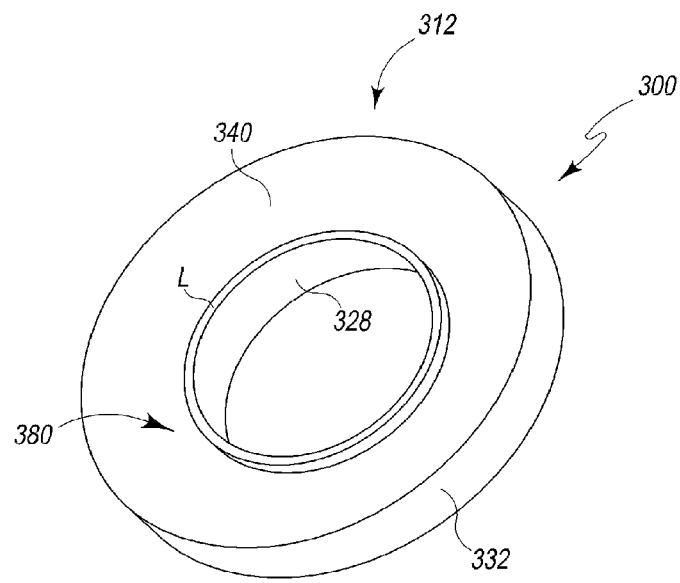
FIG. 3P shows a perspective view of the device of FIG. 3O.

FIGS. 3A-3P illustrate variations of the coned-disc spring device 300 that can be used to form spring assemblies 110. As shown in FIGS. 3A-3P, the coned-disc spring device 300 includes an exterior cone surface 320 and an interior cone surface 340. The surfaces 320, 340 are shaped such that the coned-disc spring device 300 has a frusto-conical shape, which gives it its spring characteristics. That is, the frusto-conical shape of the coned-disc spring device 300 causes the coned-disc spring device 300 to resist and push back against a force compressing the device 300. It should be noted that the surfaces 320, 340 may be oriented at various angles relative to the horizontal, hereinafter called the pitch angle. Through the selection of a pitch angle, the height of the coned-disc spring device 300 and the total deflection capability of the coned-disc spring device 300 are determined. Therefore, by adjusting the pitch angle of the surfaces 320, 340 of a device 300, the performance capabilities of the device 300 and also the performance capabilities of the spring system 100 or spring assembly 110 formed with the device 300 may be chosen.

As shown in FIGS. 3A, 3C, 3E, 3G, 3I, 3K, 3M, and 3O, a first opening 360 is defined at the first end 310 of the coned-disc spring device 300, while a second opening 380 is defined at the second end 312 of the coned-disc spring device 300 (shown in FIGS. 3B, 3D, 3F, 3H, 3J, 3L, 3N, and 3P). The first and second openings 360, 380 may be various shapes, including, but not limited to, circular and oval. The diameters of the first and second openings 360, 380 may be various sizes. Typically, the diameters are based upon the diameter of a guide rod that will be inserted through the first and second openings 360, 380 of each of the devices 300, but such diameters may also be based on various other considerations known to those skilled in the art. It should be noted that because the coned-disc spring device 300 has a frusto-conical shape, the diameter of the second opening 380 is larger than the diameter of the first opening 360.

As shown in FIGS. 3A-3P, the coned-disc spring device 300 includes first and second intermediate surfaces 328, 332 that connect the surfaces 320, 340 together. In particular, as shown in FIGS. 3A, 3C, 3E, 3G, 3I, 3K, 3M, and 3O, the first intermediate surface 328 connects the surfaces 320, 340 together at the first end 310 of the device 300, while the second intermediate surface 332 connects the surfaces 320, 340 at the second end 312 of the device 300. The intermediate surfaces 328, 332 may define various shapes. For example, the intermediate surfaces 328, 332 may define cylinders that share a longitudinal axis with the coned-disc spring device 300. In another example, the intermediate surfaces 328, 332 may each define rings that share a longitudinal axis with the coned-disc spring device 300. In other words, the intermediate surfaces 328, 332 may be, but are not required to be, substantially perpendicular to the longitudinal axis of the coned-disc spring device 300. It should be noted that the intermediate surfaces 328, 332 may define other shapes and have other configurations. For instance, the intermediate surfaces 328, 332 may be shaped in such a way so as to reduce friction with a rod or mandrel that is disposed within the coned-disc spring device 300. For example, the first intermediate surface 328 may be designed with a particular contour.

As shown in FIGS. 3A and 3B, a coned-disc spring device may include a first flange portion 390 at the second end 312 of the coned-disc spring device 300. As can best be seen in FIG. 3B, the first flange portion 390 protrudes substantially perpendicular from the plane defined by the second opening 380 at the second end 312 of the coned-disc spring device 300. In FIG. 3B, the first flange portion 390 is shown protruding from the intersection between the interior surface 340 and the second intermediate surface 332 at the second end 312. The first flange portion 390 may protrude from other surfaces and portions of the second end 312. The distance in which the first flange portion 390 protrudes away from the plane defined by the second opening 380 may depend upon the size of the coned-disc spring device 300.

Figure 2A:
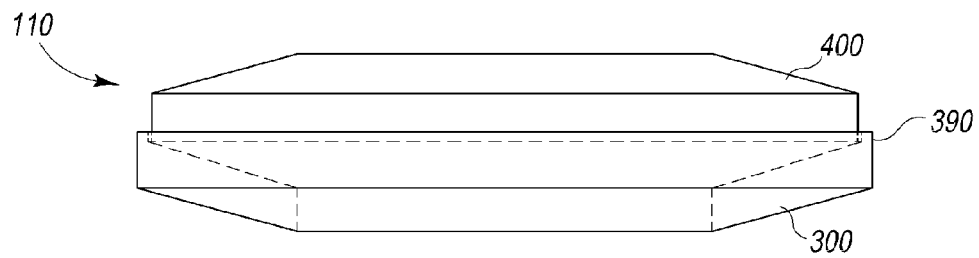
FIG. 2A shows a close-up view of the spring assembly that can be used in the spring system of FIG. 1A.

With the first flange portion 390, the coned-disc spring device 300 is able to optimally align a second spring device 400 when the second spring device 400 is mated with the coned-disc spring device 300. It will be appreciated that the second spring device 400 can have the same characteristics of any of the spring devices 300 in FIGS. 3A-3P with the characteristics being chosen based on the desired configuration of the spring assembly 110 and the mating of the spring devices 300, 400. Accordingly, the same reference numbers can be used to describe spring device 400 as spring device 300. The coned-disc spring device 300 having a first flange portion 390 may be mated with the second spring device 400 in one of two ways. First, the coned-disc spring device 300 can receive a portion of the second spring device 400 within the second opening 380 adjacent the first flange portion 390. FIG. 2A shows a spring assembly 110 with the second spring device 400 received within the coned-disc spring device 300 adjacent to the first flange portion 390. In FIG. 2A, the dashed lines show a cross-section of the coned-disc spring device, including portions of the first flange portion 390, and also show the portion of the second spring device 400 that is disposed within the coned-disc spring device 300 and adjacent to the first flange portion 390. Second, a portion of the second end 312, which includes at least the first flange portion 390, can be disposed within the second spring device 400.

When the coned-disc spring device 300 receives a portion of the second spring device 400 (e.g., FIG. 2A), the first flange portion 390 at least partially surrounds part of the second spring device 400 and is configured to interact with the exterior surface of the second spring device 400 to restrict the lateral movement of the second spring device 400 by interacting with the exterior surface of the second spring device 400. When the first flange portion 390 is disposed within the second spring device 400, the first flange portion 390 is configured to interact with an interior surface of the second spring device 400 to restrict lateral movement of the second spring device 400. In both cases, the first flange portion 390 of the coned-disc spring device 300 restricts the lateral movement of the second spring device 400 thereby maintaining the spring assembly 110 in an optimal alignment. When the first flange portion 390 surrounds a portion of the second spring device 400, the first flange portion 390 is also able to stabilize the expansion of the second spring device 400 by interacting with the disposed portion of the second spring device 400 as it deforms under force.

In addition to or as an alternative to the first flange portion 390, the coned-disc spring device 300 can include a second flange portion 395. In FIGS. 3C and 3D, the second flange portion 395 is located at the first end 310 of the coned-disc spring device 300. In particular, the second flange portion 395 protrudes substantially perpendicular from the plane defined by the first opening 360 at the first end 310 of the coned-disc spring device 300. In FIGS. 3C and 3D, the second flange portion 395 is shown protruding from the intersection between the exterior surface 320 and the first intermediate surface 328. The distance in which the second flange portion 395 protrudes away from the plane (on the x-axis) defined by the first opening 360 may be various distances. The distance in which the second flange portion 395 protrudes away from the plane (on the x-axis) defined by the first opening 360 may depend upon the size of the coned-disc spring device 300. For ease of reference, the plane (on the x-axis) by the first opening 360 shall be referred to as the horizontal reference.

Figure 2B:
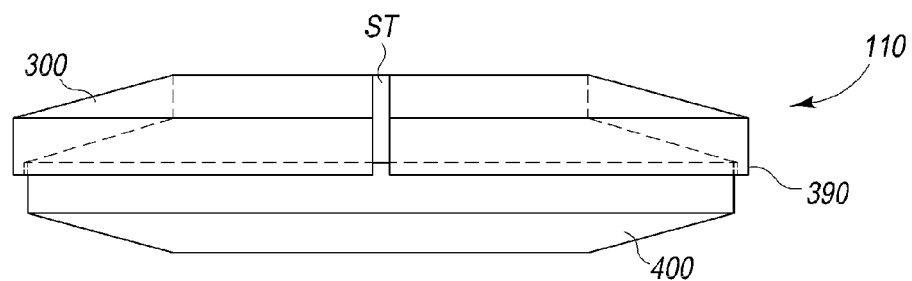
FIG. 2B shows a close-up view of the spring assembly that can be used in the spring system of FIG. 1B.
Figure 2C:
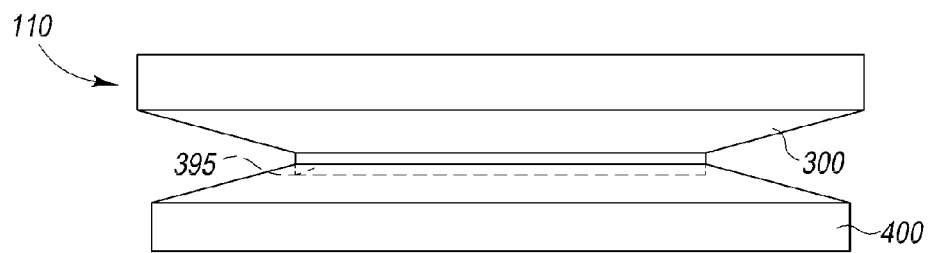
FIG. 2C shows a close-up view of the spring assembly of FIG. 1C.

With the second flange portion 395, the coned-disc spring device 300 is able to optimally align a second spring device 400 when the second flange portion 395 is mated with the coned-disc spring device 300. A coned-disc spring device 300 having a second flange portion 395 may be mated with the coned-disc spring device 300 in one of two ways. First, the coned-disc spring device 300 can receive a portion of the second spring device 400 within the first opening 360 adjacent the second flange portion 395 such that the second flange portion 395 at least partially surrounds a portion of the second spring device 400. Second, a portion of the first end 310 of the coned-disc spring device 300, which includes at least the second flange portion 395, can be disposed within the second spring device 400. FIG. 2C shows a spring assembly 110 with a portion of the second flange portion 395 received within the second spring device 400. In FIG. 2C, the dashed lines show the portion of the second flange portion 395 that is disposed within the second spring device 400.

When the coned-spring device 300 having a first flange portion 395 surrounds a part of the second spring device 400, the first flange portion 395 is configured to interact with the exterior surface of the second spring device 400 in order to restrict the lateral movement of the second spring device 400. When the second flange portion 395 is disposed within the second spring device 400 (e.g., FIG. 2C), the second flange portion 395 is configured to interact with an interior surface of the second spring device 400 to restrict lateral movement of the second spring device 400. In both cases, the second flange portion 395 of the coned-disc spring device 300 restricts the lateral movement of the second spring device 400 thereby maintaining the spring assembly 110 in an optimal alignment. When the second flange portion 395 surrounds a part of the second spring device 400, the second flange portion 395 is also able to stabilize the expansion of the second spring device 400 by interacting with the disposed portion of the second spring device 400 as it deforms under force.

In FIGS. 3B and 3D, the first flange portion 390 and second flange portion 395 completely encircle the second opening 380 and first opening 360, respectively. It should be noted that the first and second flange portions 390, 395 may not completely encircle the respective openings 380, 360. For example, the first and second flange portions 390, 395 may comprise several arc portions that only cover a fraction of the circumference around the second opening 380 and first opening 360, respectively. Such a design for the first and second flange portions 390, 395 may provide similar control capabilities as a full ring but at less cost in material.

The first and second flange portions 390, 395 may be various shapes and sizes, including, for example, having a cross-section that is rectangular, U-shaped, or various other shapes that allow the first and second flange portions 390, 395 to interact with second spring devices 400 in a manner where the movement of second spring devices 400 is controlled by the first and second flange portions 390, 395. It should be noted that a flange portion 390, 395 with a U-shaped cross-section provides a surface for second spring devices 400 to interact with that reduces hysteresis. A U-shaped cross-section also provides a shape that is often easier to prepare using molds. The flange portions 390, 395 may also be various sizes. For instance, the height of the first flange portion 390, or distance the first flange portion 390 extends away from the second opening 390, may vary depending upon the overall size of the devices 300, 400 in order to allow for the first flange portion 390 to control a second spring device 400.

Figure 1B:
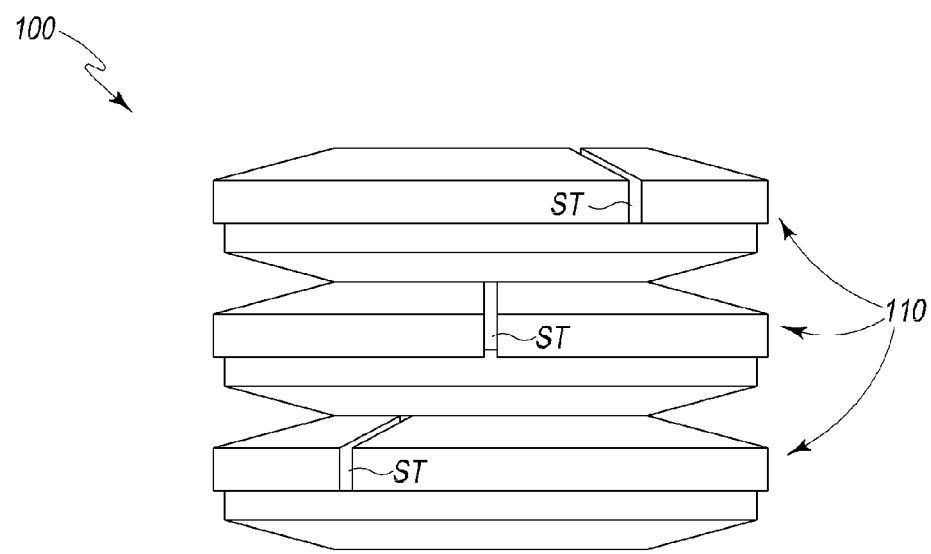
FIG. 1B shows the spring system of FIG. 1A including an optional slot ST.
Figure 1C:
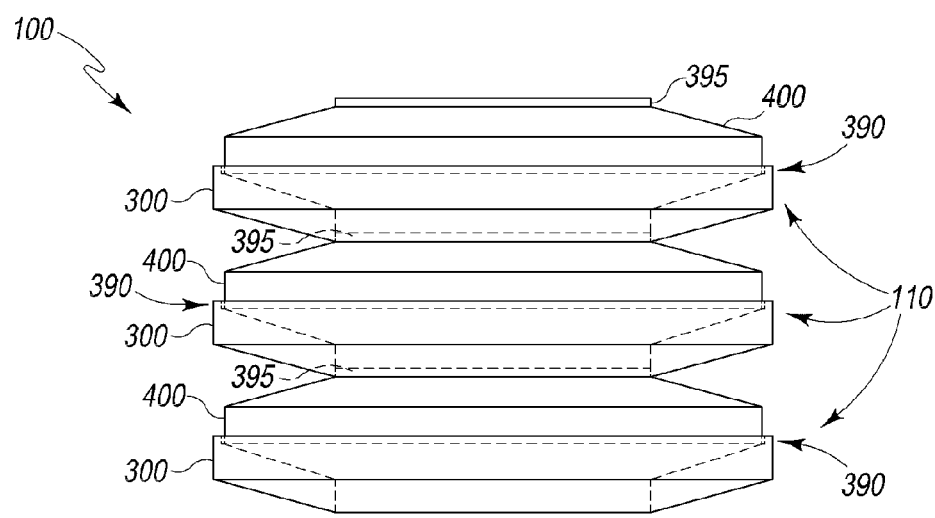
FIG. 1C shows an alternative arrangement of the spring system of FIG. 1A.
Figure 1D:
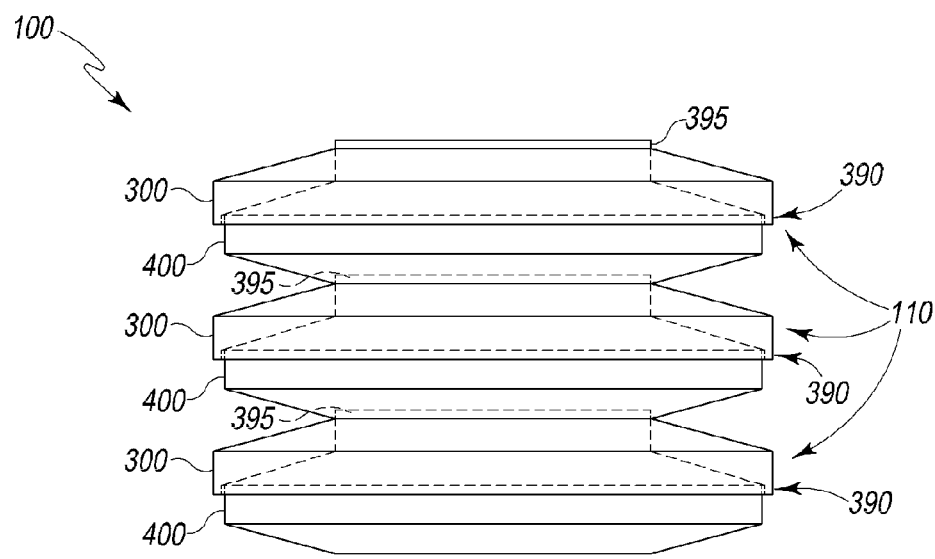
FIG. 1D shows an alternative arrangement of the spring system of FIG. 1A.
Figure 1E:
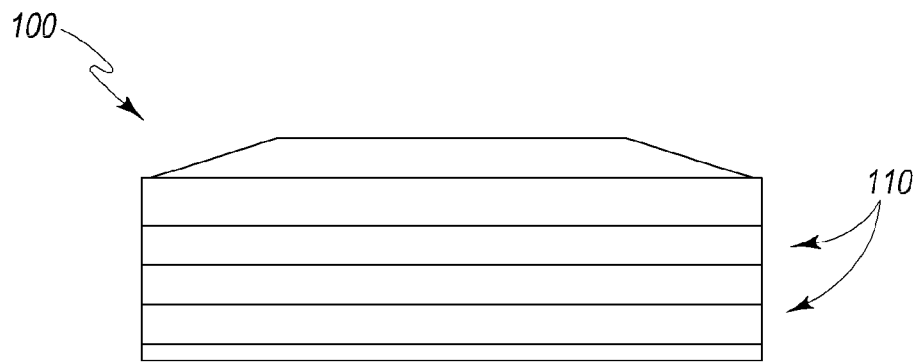
FIG. 1E shows an exemplary spring system according to at least one embodiment of the present disclosure.
Figure 1F:
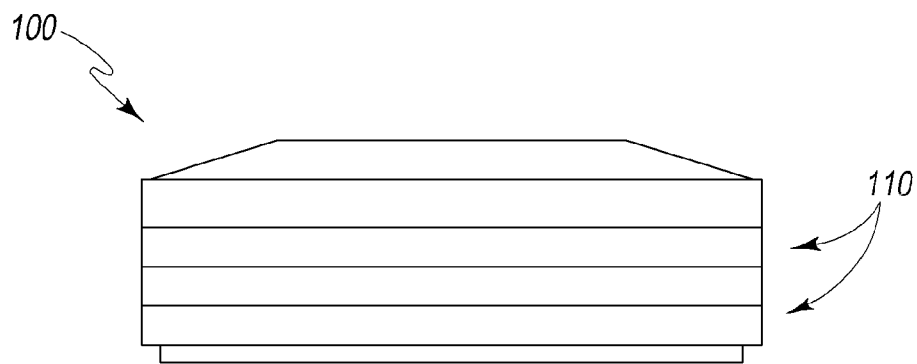
FIG. 1F shows an exemplary spring system according to at least one embodiment of the present disclosure.
Figure 1G:
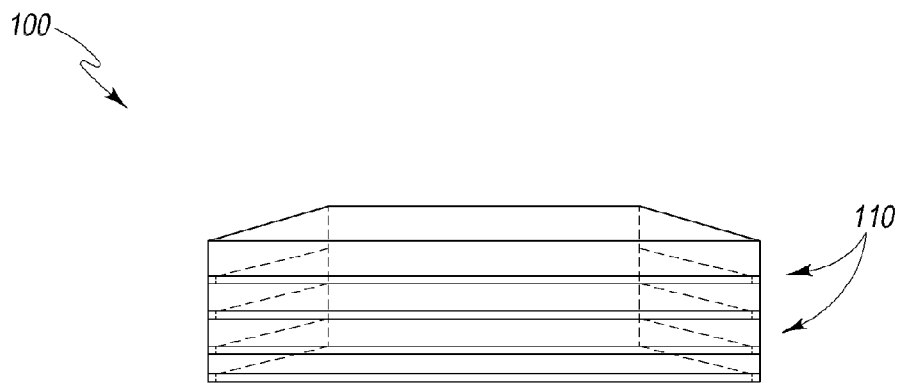
FIG. 1G shows a cross-sectional view of the spring system of FIG. 1E.
Figure 1H:
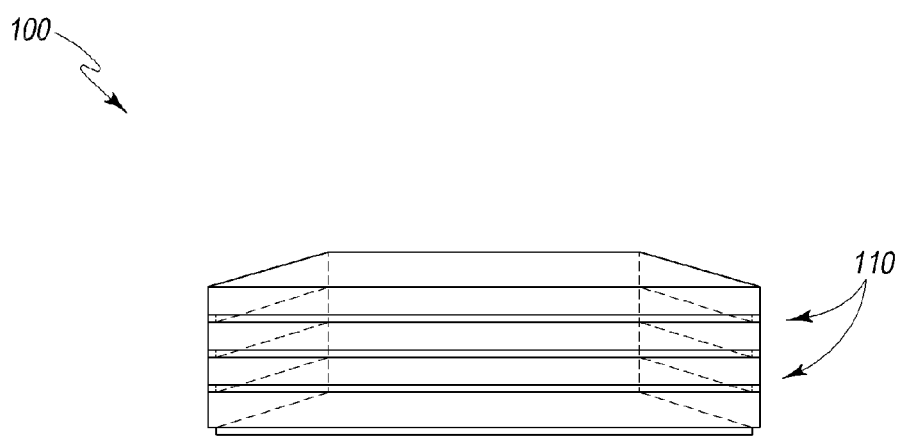
FIG. 1H shows a cross-sectional view of the spring system of FIG. 1F.

As shown in FIGS. 3E and 3F, the coned-disc spring device 300 can include both first and second flange portions 390, 395. Such a device 300 would be configured to optimally align second spring devices 400 on either side of the device 300. FIG. 1D shows a spring system 100 that includes second spring devices 400 mated with coned-disc spring devices 300 that have first and second flange portions 390, 395. As shown in FIG. 1C, a spring system 100 may include devices 300, 400 that alternate between having a first flange portion 390 and a second flange portion 395 in order to optimally align the spring system 100.

In addition to or as an alternative to the first flange portion 390 and/or second flange portion 395, the coned-disc spring device 300 (and/or second spring device 400) can include one or more lips L and/or as described below, one or more grooves G. In FIGS. 3G and 3H, a lip L is located on the interior surface 340 adjacent the second intermediate surface 332 of the coned-disc spring device 300. As shown in FIGS. 3G and 3H, the lip L is shown protruding from the intersection between the interior surface 340 and the second intermediate surface 332 at the second end 312. In FIGS. 3I and 3J, a lip L is located on exterior cone surface 320 adjacent the first intermediate surface 328 of the coned-disc spring device 300. As shown in FIGS. 3I and 3J, the lip L is shown protruding from the exterior surface 320 adjacent the first intermediate surface 328 at the first end 310. In FIGS. 3K and 3L, a first lip L1 is on the exterior surface 320 adjacent the first intermediate surface 328, and a second lip L2 is on the interior surface 340 adjacent the second intermediate surface 332. As shown in FIGS. 3K and 3L, the first lip L1 is shown protruding from the exterior surface 320 adjacent the first intermediate surface 328 at the first end 310, and the second lip L2 is shown protruding from the intersection between the interior surface 340 and the second intermediate surface 332 at the second end 312. The lips L, L1, L2 may additionally or alternatively protrude from other surfaces and portions of the device 300. The distance in which the lips L, L1, L2 protrude away may depend upon the size of the coned-disc spring device 300.

Figure 2D:
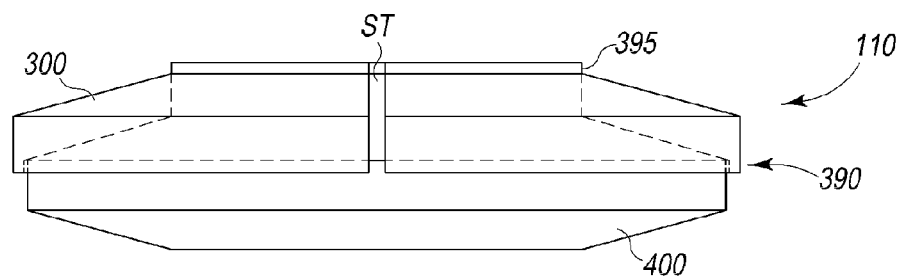
FIG. 2D shows a close-up view of the spring assembly of the spring system of FIG. 1D.
Figure 2E:
FIG. 2E shows a close-up view of the spring assembly that can be used in the spring system of FIG. 1E.
Figure 2F:
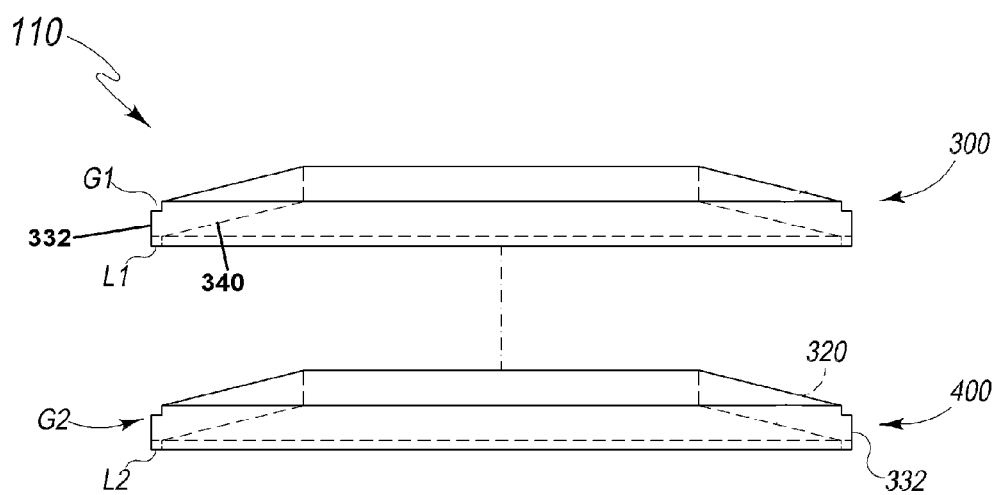
FIG. 2F shows an exploded view of the spring assembly of FIG. 2E.
Figure 2G:
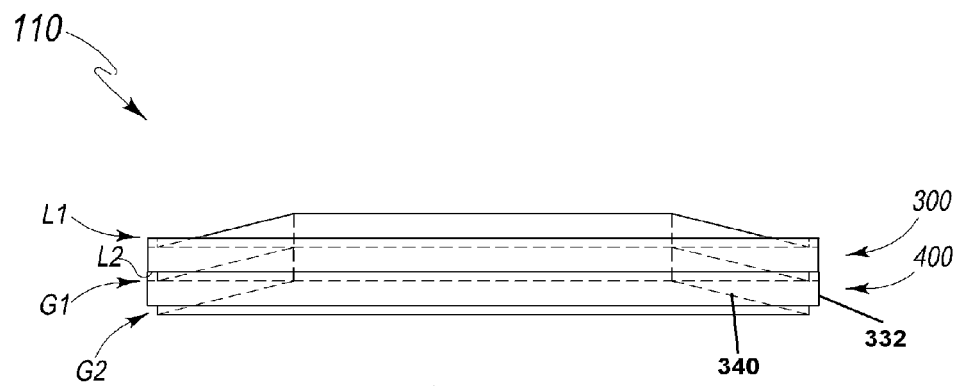
FIG. 2G shows a close-up view of the spring assembly that can be used in the spring system of FIG. 1F.
Figure 2H:
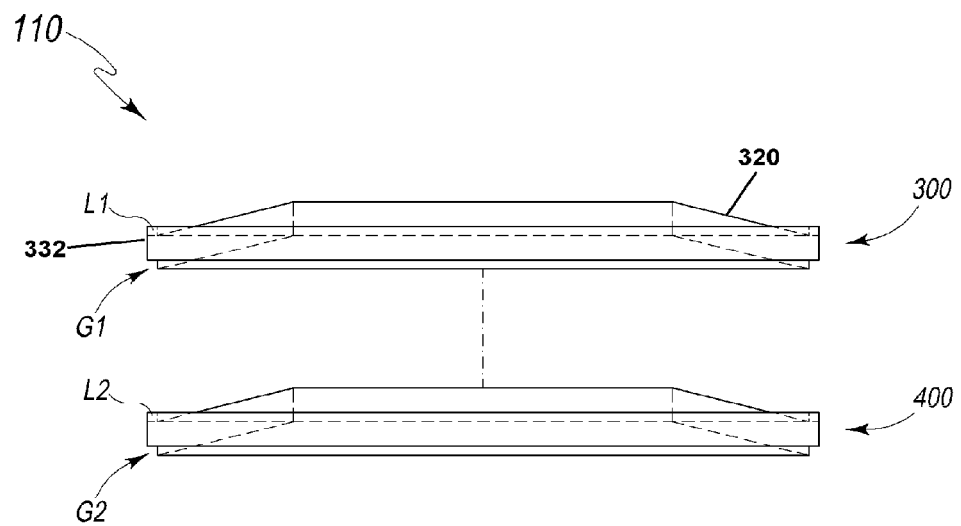
FIG. 2H shows an exploded view of the spring assembly of FIG. 2G.
Figure 2I:
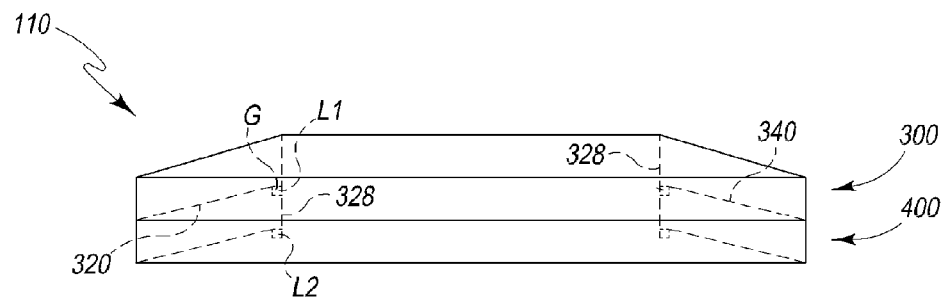
FIG. 2I shows a close-up view of a spring assembly that can be used in a spring system according to at least one embodiment of the present disclosure.
Figure 2J:
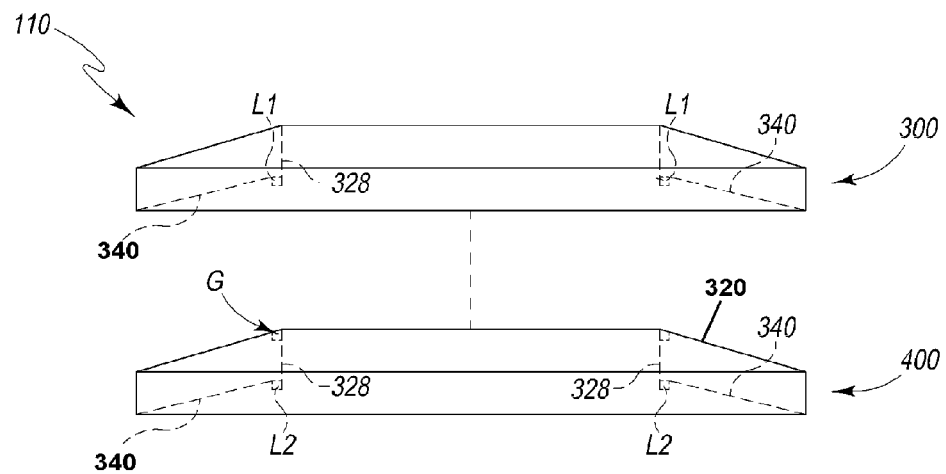
FIG. 2J shows an exploded view of the spring assembly of FIG. 2I.
Figure 2K:
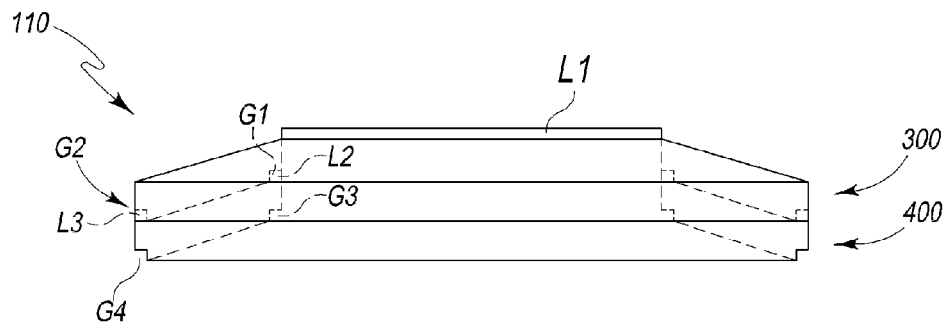
FIG. 2K shows a close-up view of a spring assembly that can be used in a spring system according to at least one embodiment of the present disclosure.
Figure 2L:
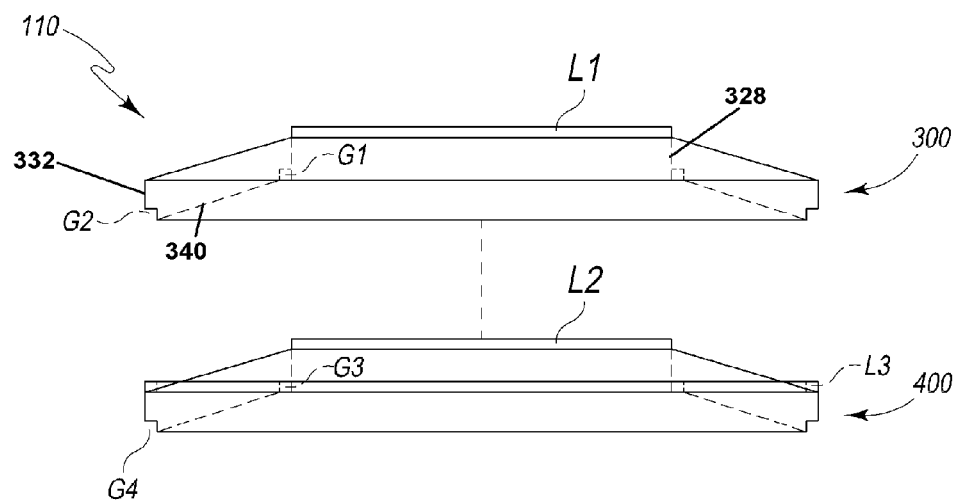
FIG. 2L shows an exploded view of the spring assembly of FIG. 2K.

As noted above, the coned-disc spring device 300 (and/or second spring device 400) can include one or more grooves G located in various locations. In FIG. 2E and FIG. 2F (which is an exploded view of FIG. 2E), a groove G is located on the exterior surface 320 adjacent the second intermediate surface 332 of the device 400. In FIG. 2G and FIG. 2H (which is an exploded view of FIG. 2H), a groove G is located on the interior surface 340 adjacent the second intermediate surface 332 of the device 400. As shown in FIG. 2I and FIG. 2J (which is an exploded view of FIG. 2I), a groove G is located on the exterior surface 320 adjacent the first intermediate surface 328 of the device 400. As shown in FIG. 2K and FIG. 2L (which is an exploded view of FIG. 2K), a first groove G1 is located on the interior surface 340 adjacent the first intermediate surface 328 of the device 300 and a second groove G2 is located on the interior surface 340 adjacent the second intermediate surface 332 of the device 300. One or more grooves G may additionally or alternatively be located on other portions of the first spring device 300 and/or second spring device 400. As shown in FIGS. 3G-3P, a device 300 may include both one or more grooves G and one or more lips L.

With the one or more lips L, a device 300, 400 may be mated with another device having one or more grooves G by the one or more grooves G receiving at least a portion of the one or more lips L. By mating the devices 300, 400 using lips L and grooves G, the devices 300, 400 are able to be optimally aligned relative to one another. As used herein, it will be appreciated that the second spring device 400 can have the same characteristics of any of the spring devices 300 (and vice versa) with the characteristics being chosen based on the desired configuration of the spring assembly 110 and the mating of the spring devices 300, 400. Accordingly, the same reference numbers can be used to describe spring device 400 as spring device 300.

When one of the devices 300, 400 receives a portion of one or more lips of the other device (e.g., FIGS. 2E-2L), the lip(s) L at least partially surrounds or substantially fits within part of the other device and is configured to interact with a surface of the groove G of the other device to restrict the lateral movement of the other device. The lip(s) L restricts the lateral movement of the other device thereby maintaining the spring assembly 110 in an optimal alignment. When the lip(s) L of a device 300, 400 surrounds a portion of or substantially fits within another device, the lip(s) L is also able to stabilize the expansion (or contraction, depending upon the configuration) of the other device by interacting with the other device as it deforms under force.

FIGS. 2E-2L show spring assemblies 110 with the lip(s) L of a device 300, 400 received within the groove(s) G of the other device 300, 400. In FIGS. 2E and 2F, a groove G2 is located on the exterior surface 320 adjacent the second intermediate surface 332 of the second spring device 400, and a lip L1 is located on the interior surface 340 adjacent the first intermediate surface 328 of the coned-disc spring device 300 and received within groove G2. In FIGS. 2G and 2H, the second spring device 400 includes a lip L2 located on the exterior surface 320 adjacent the second intermediate surface 332, which is mated with the first groove G1 of the coned-disc spring device 300. As shown in FIGS. 2G and 2H, the second spring device 400 also includes a second groove G2 located on the interior surface 340 adjacent the second intermediate surface 332. This second groove G2 can allow the second spring device 400 to be mated with a third device.

In FIGS. 2I and 2J, a groove G is located on the exterior surface 320 adjacent the first intermediate surface 328 of the second spring device 400, and the lip L is located on the interior surface 340 adjacent the first intermediate surface 328 of the coned-disc spring device 300 and received within groove G. In FIGS. 2K and 2L, the second spring device 400 may include two grooves G3, G4, each located on the interior surface 340 with one adjacent the first intermediate surface 328 and the other adjacent the second intermediate surface 332, and two lips L2, L3, each located on the exterior surface 320 with one adjacent the first intermediate surface 328 and the other adjacent the second intermediate surface 332. As shown in FIGS. 2K and 2L, the lips L2, L3 can be received within the grooves G1, G2 of the device 300 while the grooves G3, G4 can allow the device 400 to mate with a third device.

Each lip L of a device 300, 400 may be various shapes and sizes, including, for example, having a cross-section that is rectangular, U-shaped, or various other shapes that allow the lip to interact with another device having a groove G in a manner where the movement of the other device is controlled by the one or more lips L. It should be noted that a lip L with a U-shaped cross-section provides a surface for devices to interact with that reduces hysteresis. A U-shaped cross-section also provides a shape that is often easier to prepare using molds. The grooves G may also be various sizes. For instance, the depth of a groove G may vary depending upon the overall size of the devices 300, 400 in order to allow for the lip L to mate with a groove G.

As shown in FIGS. 3G-3P, the coned-disc spring device 300 can include both lips L and grooves G. Such a device 300 may be configured to optimally align another device or be optimally aligned itself by another device. A spring system 100 may include devices 300, 400 that have one or more lips L and/or one or more grooves G in various locations and in various combinations on the devices 300, 400 in order to optimally align the spring system 100.

With optimal alignment of the devices 300, 400, the maximum total deflection, rate variation, and rate tuning of spring assemblies 110 and overall spring systems 100 are improved. The optimal alignment achieved with the first flange portion 390, second flange portion 395, and/or lips L and grooves G also reduces hysteresis losses during the compression-expansion cycle of the spring assembly 100. Additionally, spring assemblies 110 and spring systems 100 are able to minimize side loading without the need for additional components. The ability to orient and retain devices 300, 400 in a spring assembly 110 also expands application opportunities for the spring assembly 110 (and spring system 100) because the spring assembly 110 (and spring system 100) can be placed in any physical orientation and still maximize total deflection while minimizing side loading because the devices 300, 400 align themselves using the first flange portion 390, second flange portion 395, and/or lips L and grooves G.

It should be noted that the optimal alignment provided by the first flange portion 390, second flange portion 395, and/or lips L and grooves G also reduces friction. For spring systems 100, friction may arise between individual devices 300, 400, between devices 300, 400 and the guide element, and areas of the devices 300, 400 where load is applied. Through optimal alignment, the devices 300, 400 may avoid, for example, frictional interaction with a guide element or between themselves.

As used herein, a second spring device 400 may be, for example, a coned-disc spring device 300 having a first flange portion, a second flange portion, and/or a lip L and/or groove G, a coned-disc spring device that does not include a first flange portion, a second flange portion, and/or a lip L and/or groove G, or another type of spring device that is configured to mate with the coned-disc spring device 300 of the present disclosure. Typically, the coned-disc spring device 300 and the second spring device 400 of a spring assembly 110 will have similar geometry because any deviation in geometry between such devices 300, 400 can result in an uneven transmission of load from one spring assembly 110 to the next in a spring system 100. Such uneven transmission of load tends to cause a lateral displacement of the devices 300, 400, or a buckling of the spring system 100, causing the devices 300, 400 to be pressed with force against the guide element. While the geometry of the devices 300, 400 may generally be similar, it should be noted that the openings 340, 360 of the coned-disc spring device 300 and the openings of the second spring device 400 are sized in order for the devices 300, 400 to be mated as described herein.

Figure 4A:
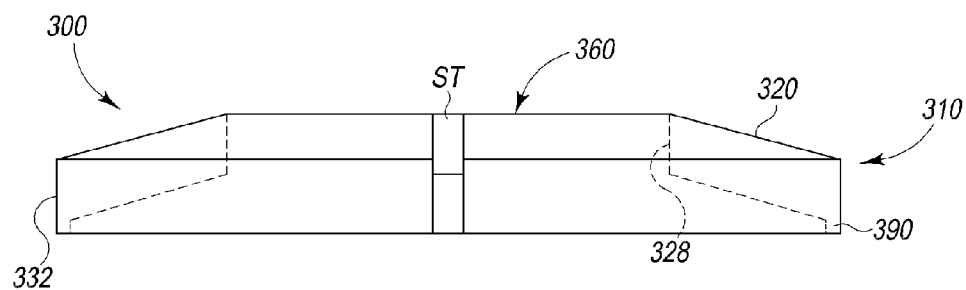
FIG. 4A shows a front view of another coned-disc spring device that can be used in the spring assemblies of FIG. 1B.
Figure 4B:
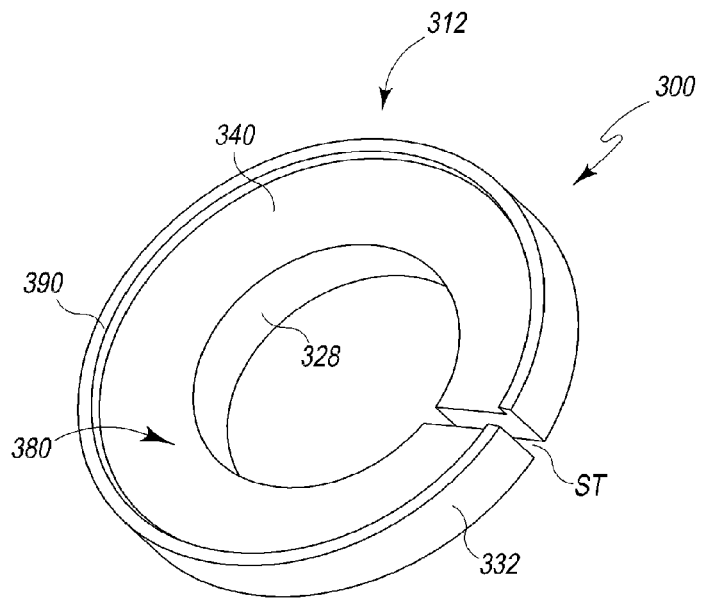
FIG. 4B shows a perspective view of the device of FIG. 4A.
Figure 4C:
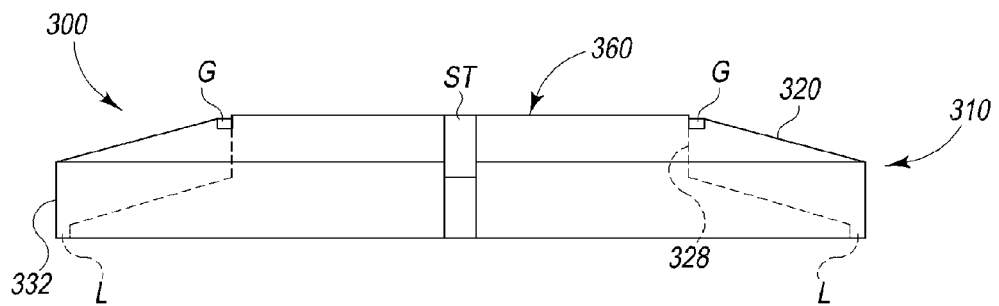
FIG. 4C shows a front view of another coned-disc spring device according to at least one embodiment of the present disclosure.
Figure 4D:
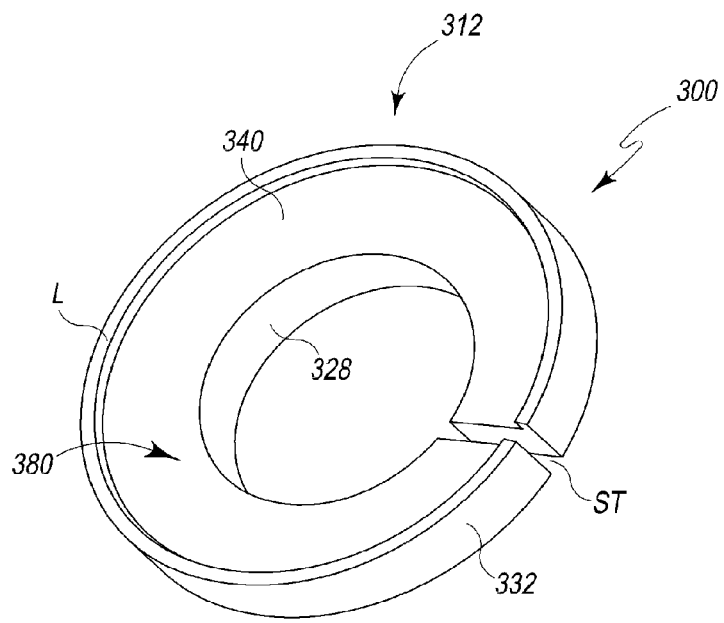
FIG. 4D shows a perspective view of the device of FIG. 4C.

As shown in FIGS. 4A-4D, the coned-disc spring device 300 may also include a slot ST. A slot ST includes a cutout through surfaces 320, 340 that extends from the first end 310 to the second end 312 of the device 300. As shown in FIG. 4B, a device 300 with a slot ST is not a continuous frustum. While FIGS. 4A and 4B show a coned-disc spring device 300 with a first flange portion 390 having a slot ST and FIG. 2B shows a spring assembly 110 that includes the same coned-disc spring device 300 of FIGS. 4A and 4B, various types of coned-disc spring devices 300 (and second spring devices 400) may also include a slot ST. For example, a coned-disc spring device 300 that includes a second flange portion 395 or includes both first and second flange portions 390, 395 may include a slot ST. FIG. 2D shows a spring assembly 110 that includes a coned-disc spring device 300 having both first and second flange portions 390, 395 and a slot ST. Also, FIGS. 4C and 4D show a coned-disc spring device 300 that includes a lip L, groove G, and a slot ST.

The slot ST in the device 300 (and/or device 400) provides for the capability of achieving a nearly linear rate versus deflection characteristic and depending upon the width of the slot ST, may enable the utilization of aggressive pitch angles. By varying slot width and varying the orientation of the slots between spring assemblies 110, the linearity of rate versus deflection can be adjusted over a wide range for a spring system 100. For example, FIG. 1B shows a spring system 100 that has a varying orientation of slots ST. In particular, FIG. 1B shows the slots ST of adjacent spring assemblies 110 of a spring system 100 as being staggered by thirty degrees from each other. The slots ST of adjacent spring assemblies 110 may be staggered relative to one another at various other angles, such as, for example, sixty degrees, one hundred twenty degrees, and one hundred eighty degrees. Alternatively, the slots ST of adjacent spring assemblies 110 in a spring system 100 may be oriented in the same direction.

Figure 5:
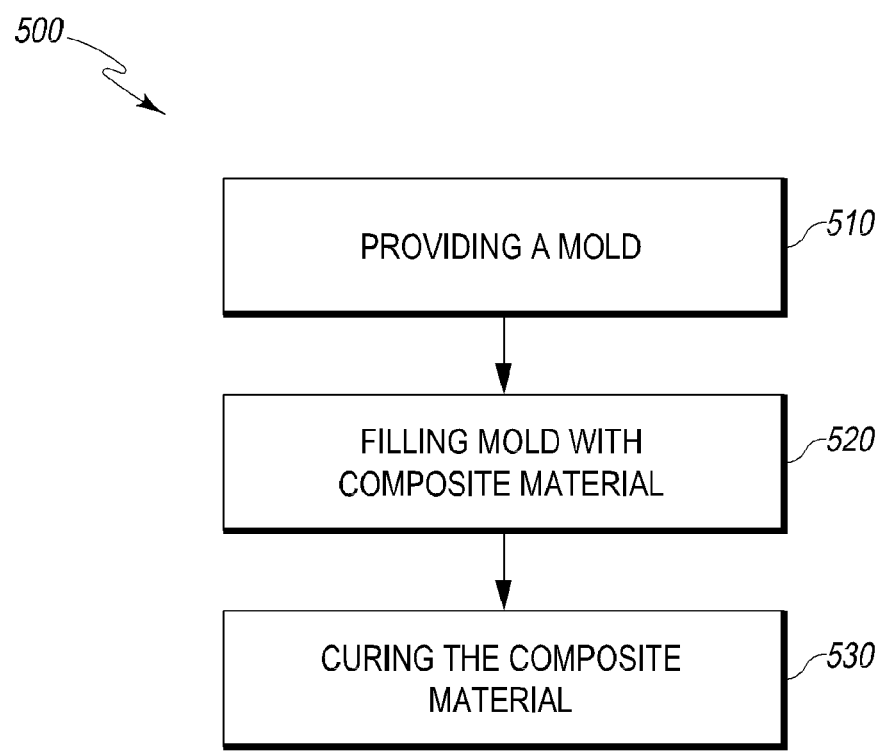
FIG. 5 shows a flowchart of an exemplary method of forming a carbon-composite coned-disc spring device according to at least one embodiment of the present disclosure.

The coned-disc spring device 300 and second spring device 400 may be formed of various materials, such as, for example, metals and carbon-composite. Each device 300, 400 may be created using a variety of processes, such as, for example, stamping, fine blanking, or plasma arc/flame cutting. FIG. 5 illustrates a method for forming a coned-disc spring device from carbon-composite 500. In FIG. 5, the method 500 includes the step 510 of providing a mold that is designed to produce a coned-disc spring device 300 herein. The method 500 also includes the step 520 of filling at least a portion of the mold with a composite material. The composite material may include various composite materials, such as carbon fibers or pre-impregnated composite fibers. Filling at least a portion of the mold may involve loading composite fibers or other dry composite material into the mold, such as by filament winding, braiding, or hand placement, and then transferring a resin into the mold. Of course, for pre-impregnated composite fibers, this step may simply include placing the pre-impregnated fibers in the mold. The method 500 also includes the step 530 of curing the composite material. That is, once the composite material has filled the mold, the composite material may be cured by heating, such as, for example, by radiation.

While other materials may be used, it should be noted that a carbon-composite construction for the coned-disc spring device 300 provides several advantages. First, it provides a significant weight advantage over other materials and provides an extremely high strength-to-weight ratio compared to metal construction. In many applications (e.g., automotive and aerospace), the weight of components is a core concern in development and design. Second, carbon-composite material is non-corrosive and can be used in environments that have significant exposure to relatively high concentrations of acids and bases. Carbon-composite material is also non-magnetic, a good dielectric and recyclable. Therefore, carbon-composite material would permit a spring system 100 to be used in a broad spectrum of applications. Third, carbon-composite material also permits the use of aggressive pitch angles for coned-disc spring devices 300, which allows for more deflection and greater potential applications. Fourth, the lack of uniform grain structure of carbon-composite material eliminates problems with resonant frequencies that may otherwise hinder performance of a spring system 100 in some applications.

Figure 6:
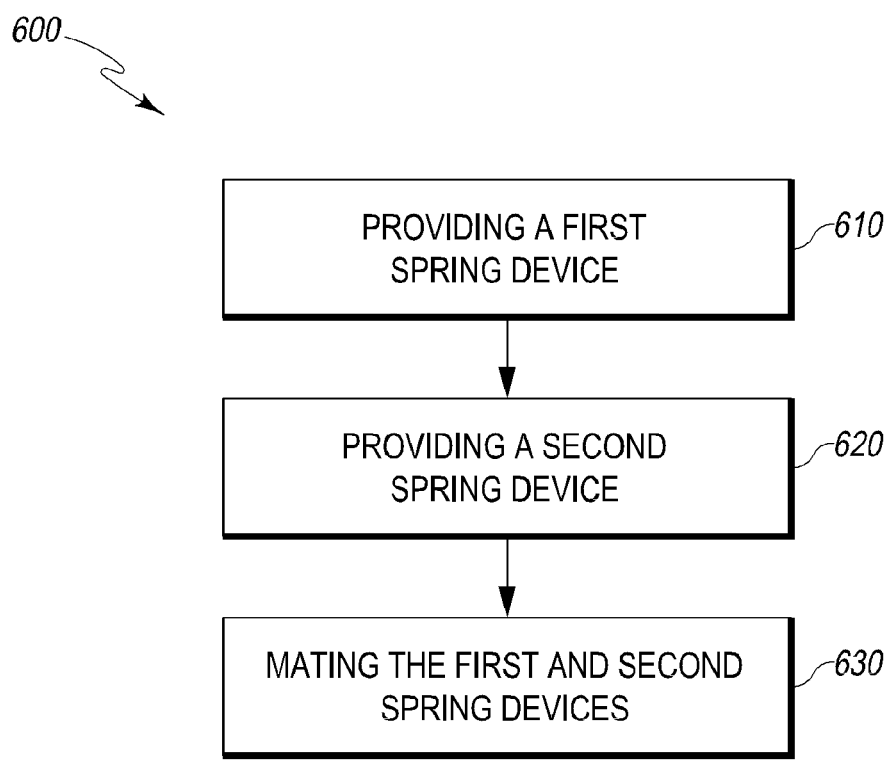
FIG. 6 shows a flowchart of an exemplary method of assembling a spring assembly according to at least one embodiment of the present disclosure.

FIG. 6 illustrates a method of forming a spring assembly 600. In FIG. 6, the method 600 includes the step 610 of providing a first coned-disc spring device 300 and the step of 620 of providing a second spring device 400. The method 600 also includes the step 630 of mating the first and second devices. As described herein, the devices 300, 400 may include a first flange portion 390, a second flange portion 395, one or more lips L, and/or one or more grooves G. The two devices 300, 400 can be mated by inserting a portion of one device into the other such that the first flange portion 390 or second flange portion 395 of one device optimally aligns the other device relative to the device with the flange portion 390 or 395. The two devices 300, 400 can also be mated by inserting a portion of one device into the other such that the one or more lips L of one device is at least partially received within the one or more grooves G of the other device in order to optimally align the other device relative to the device with the one or more lips L. For example, the two devices 300, 400 may be mated by inserting at least a portion of the second device 400 into the second opening 380 of the first device 300 so that the first flange portion 390 of the first device 300 optimally aligns the second device 400 relative to the first device 300. In another example, the two devices 300, 400 may be mated by inserting at least a portion of the second flange portion 390 of the first device 300 into the second device 400 so that the second flange portion 395 optimally aligns the second device 400. In another example, the two devices 300, 400 may be mated by inserting at least a portion of the second device 400 into the second opening 380 of the first device 300 so that a lip L of the first device 300 optimally aligns the second device 400 relative to the first device 300.

Figure 4E:
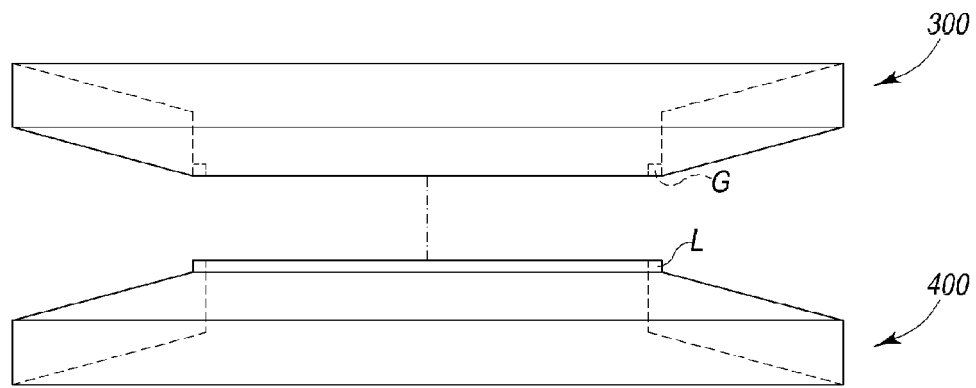
FIG. 4E shows an exploded view of a spring assembly that can be used in a spring system according to at least one embodiment of the present disclosure.
Figure 4F:
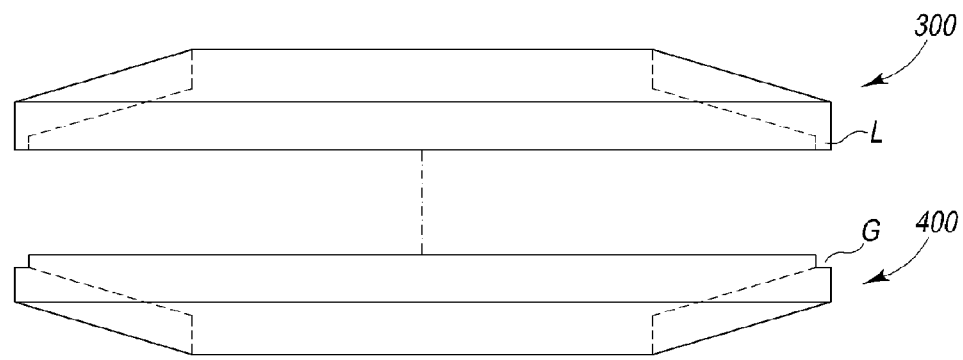
FIG. 4F shows an exploded view of a spring assembly that can be used in a spring system according to at least one embodiment of the present disclosure.

FIGS. 1A-1D and 2A-2D show devices 300, 400 in a series stack configuration. A series stack configuration means that the ends of devices 300, 400 with the larger diameters are in contact with one another and the ends of devices 300, 400 with the smaller diameters are in contact one another. It should be noted that the coned-disc spring devices 300, 400 in FIGS. 1A-1D and 2A-2D may also be stacked in parallel configuration. In a parallel configuration, the devices 300, 400 are arranged with the cones in the same direction. FIGS. 1E-1H and 2E-2L show devices 300, 400 in a parallel stack configuration with lips L mated with grooves G. FIGS. 4E and 4F show exploded views of devices 300, 400 in a series configuration with lips L mated with grooves G. The ability to adjust rates and total deflection by adding devices 300, 400 in series or parallel configuration provides a broad range of adjustability to fine-tune a spring system 100 to a given application. While the above devices 300, 400 have been described as having grooves G and/or lips L adjacent the intersection between interior/exterior surfaces 320, 340 and intermediate surfaces 328, 332, it should be noted that one or more grooves G and/or one or more lips L may be located on the interior/exterior surfaces 320, 340 anywhere along such surface, such as, for example, mid-way between the intermediate surfaces 328, 332.

While this disclosure has been described as having various embodiments, these embodiments according to the present disclosure can be further modified within the scope and spirit of this disclosure. This application is therefore intended to cover any variations, uses, or adaptations of the disclosure using its general principles. A practitioner may determine in a particular implementation that a plurality of components of the disclosed assembly may be combined in various ways, or that different components or different variations of the components may be employed to accomplish the same results. A practitioner may also determine in a particular implementation that a plurality of steps of the disclosed method may be combined in various ways, or that different steps or variations of the steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

What is claimed is:

1. A spring assembly comprising:
   a first coned-disc spring device defining a first opening at a first end of the first device and a second opening at a second end of the first device, a first centerpoint of the first opening and a second centerpoint of the second opening defining an axis, the first device comprising a first lip portion at the second end of the first device adjacent to and at least partially encircling the second opening and protruding substantially perpendicular to a horizontal plane defined by the second opening, wherein the second opening has a larger diameter than the first opening, wherein the first device defines a first slot that extends between the first end of the first device to the second end of the first device such that the first device is not a continuous frustum; and
   a second coned-disc spring device defining a third opening at a first end of the second spring device and a fourth opening at a second end of the second spring device, the second spring device comprising a first groove portion at the first end of the second spring device, wherein the fourth opening has a larger diameter than the third opening,
   wherein the first end of the second spring device is received within the second end of the first device such that the first lip portion is received within the first groove portion optimally aligning the second spring device, and
   wherein the spring devices are aligned such that successive devices are immediately adjacent at substantially all areas of the first and second spring devices disposed at a radial distance from the axis that is less than the radial distance of the first lip portion from the axis.

2. The spring assembly of claim 1, wherein the second device defines a second slot that extends between the first end of the second device to the second end of the second device such that the second device is not a continuous frustum.

3. The spring assembly of claim 1, wherein a width of the first slot corresponds to a linearity rate of the spring assembly versus deflection of the spring assembly.

4. The spring assembly of claim 1, wherein the first device comprises carbon-composite.

5. The spring assembly of claim 1, wherein the diameter of the third opening is substantially the same as the diameter of the second opening.

6. The spring assembly of claim 1, wherein the first device comprises a second lip portion at the first end of the first device adjacent to the first opening and protruding substantially perpendicular to the plane defined by the first opening.

7. The spring assembly of claim 6, wherein the second spring device comprises a second groove portion at the second end of the second spring device adjacent to and at least partially encircling the fourth opening of the second spring device, wherein the second lip portion is received within the second groove portion optimally aligning the second spring device.

8. The spring assembly of claim 2, wherein the first slot of the first device is offset from the second slot of the second spring device.

9. A coned-disc spring device, the device comprising:
   a first end defining a first opening;
   a second end defining a second opening, wherein the diameter of the second opening is larger than the diameter of the first opening and wherein a first centerpoint of the first opening and a second centerpoint of the second opening define and axis;
   a first lip portion at the second end of the device adjacent to and at least partially encircling the second opening and protruding substantially perpendicular to a horizontal plane defined by the second opening such that when a portion of a first end of a second spring device having a first groove portion is received within the second opening, the first lip portion is received within the first groove portion optimally aligning the second spring device; and
   a second groove portion at the second end of the device such that when a portion of the device is received within a third spring device having a second lip portion formed at a first end of the third spring device, the second lip portion is received within the second groove portion optimally aligning the third spring device;

wherein the spring devices are aligned such that successive devices are immediately adjacent at substantially all areas of the first and second spring devices disposed at a radial distance from the axis that is less than a radial distance of the first lip portion from the axis.

10. The coned-disc spring device of claim 9, further comprising a third groove portion at the first end of the device such that when a portion of the device is received within the third spring device having a third lip portion, the third lip portion is received within the third groove portion optimally aligning the third spring device.

11. The coned-disc spring device of claim 9, further defining a slot that extends between the first end to the second end such that the device is not a continuous frustum.

12. The coned-disc spring device of claim 9, wherein the device comprises carbon-composite.

13. The coned-disc spring device of claim 9, wherein the device comprises metal.

14. The coned-disc spring device of claim 9, wherein the device comprises a third lip portion at the first end of the device adjacent to the first opening and protruding substantially perpendicular to a horizontal plane defined by the first opening such that when the portion of the second spring device having a third groove portion is received within the second opening, the third lip portion is received within the third groove portion optimally aligning the second spring device.

15. The coned-disc spring device of claim 14, further comprising a fourth groove portion at the first end of the device such that when a portion of the device is received within the third spring device having a fourth lip portion, the fourth lip portion is received within the fourth groove portion optimally aligning the device.

16. A method of assembling a spring system, the method comprising:
providing a first coned-disc spring device, the first device comprising:
a first end of the first device defining a first opening;
a second end of the first device defining a second opening, wherein the diameter of the second opening is larger than the diameter of the first opening and wherein a first centerpoint of the first opening and a second centerpoint of the second opening define an axis;
a first lip portion at the second end of the first device adjacent to and at least partially encircling the second opening and protruding substantially perpendicular to a horizontal plane defined by the second opening; and
a slot that extends between the first end of the first device to the second end of the first device such that the first device is not a continuous frustum; and
providing a second spring device, the second device comprising:
a first end of the second device defining a third opening;
a second end of the second device defining a fourth opening, wherein the diameter of the fourth opening is larger than the diameter of the third opening; and
a first groove portion at the first end of the second device; and
mating the first device and the second device such that at least a portion of the first end of the second device is received within at least a portion of the second opening of the first device, wherein the first lip portion is received within the first groove portion to optimally align the second device, wherein the spring devices are aligned such that successive devices are immediately adjacent at substantially all areas of the first and second spring devices disposed at a radial distance from the axis that is less than a radial distance of the first lip portion from the axis.

17. The method of claim 16, wherein the second device comprises a second groove portion at the second end of the second device adjacent to and at least partially encircling the fourth opening of the second device, further comprising the step of receiving a third spring device having a second lip portion within at least a portion of the fourth opening of the second device, wherein the second lip portion of the third spring device is received within the second groove portion of the second spring device optimally aligning the second spring device and the third spring device.

* * * * *